United States Patent
Jeppsen et al.

(10) Patent No.: US 7,032,042 B2
(45) Date of Patent: Apr. 18, 2006

(54) REQUEST CONVERSION

(75) Inventors: Roger C. Jeppsen, Chandler, AZ (US); Nathan E. Marushak, Gilbert, AZ (US)

(73) Assignee: Intel Corporation, Santa Clara, CA (US)

( * ) Notice: Subject to any disclaimer, the term of this patent is extended or adjusted under 35 U.S.C. 154(b) by 303 days.

(21) Appl. No.: 10/659,959

(22) Filed: Sep. 10, 2003

(65) Prior Publication Data

US 2005/0055480 A1 Mar. 10, 2005

(51) Int. Cl.
*G06F 3/00* (2006.01)

(52) U.S. Cl. .......... 710/60; 710/5; 710/6; 710/29; 710/30; 710/33; 710/35; 710/36; 710/58

(58) Field of Classification Search .......... 710/5, 710/58, 60, 6, 29, 30, 33, 35, 36
See application file for complete search history.

(56) References Cited

U.S. PATENT DOCUMENTS

| | | | |
|---|---|---|---|
| 5,572,659 A * | 11/1996 | Iwasa et al. | 714/6 |
| 6,047,340 A * | 4/2000 | Kase et al. | 710/60 |
| 6,802,064 B1 * | 10/2004 | Yao et al. | 718/102 |
| 2004/0081179 A1 * | 4/2004 | Gregorcyk, Jr. | 370/402 |
| 2005/0027936 A1 * | 2/2005 | Yao et al. | 711/112 |

* cited by examiner

*Primary Examiner*—Kim Huynh
*Assistant Examiner*—Justin Knapp
(74) *Attorney, Agent, or Firm*—Caroline M. Fleming

(57) ABSTRACT

In one embodiment, a method may include, if an amount of data requested to be transferred by a data transfer request according to a first protocol exceeds a maximum data transfer amount permitted to be requested by a single data transfer request according to a second protocol, generating one data transfer request according to the second protocol and a data structure, and modifying, at least in part, another data structure. This data transfer request may request transfer of a portion of the data. The data structure may include one or more values identifying, at least in part, another portion of the data. The modifying may be based, at least in part, upon the one or more values. The other data structure may include, prior to being modified, one or more other values indicating, at least in part, one or more parameters of the one data transfer request.

22 Claims, 4 Drawing Sheets

REQUEST CONVERSION

FIELD

This disclosure relates to request conversion.

BACKGROUND

In one conventional data storage arrangement, a computer node includes a host processor and a host bus adapter (HBA). The HBA is coupled to a data storage device. A host processor in the computer node issues a first data transfer request that complies with a first protocol. The HBA converts the request into one or more other data transfer requests that comply with a second protocol, and issues the one or more other requests to the data storage device. In this arrangement, it is possible that the data transfer amount requested by a single data transfer request according to the first protocol may exceed the maximum data transfer amount that a single data transfer request according to the second protocol can request.

One proposed solution to the problem is to restrict the maximum data transfer amount that can be requested by a single data transfer request according to the first protocol such that it is less than or equal to the maximum data transfer amount that can be requested by a single data transfer request according to the second protocol. Disadvantageously, one or more processes that implement the first protocol are modified to carry out this proposed solution; this may limit the types of processes that may be executed to implement the first protocol. Also disadvantageously, a greater number of data transfer requests according to the first protocol may be generated and issued; this may increase the amount of processing resources that may be consumed to generate data transfer requests according to the first protocol.

In another proposed solution, if the data transfer amount requested by a data transfer request according to the first protocol exceeds the maximum data transfer amount that can be requested by a single data transfer request according to the second protocol, the HBA generates and stores in memory a linked list of separate data transfer requests according to the second protocol. The respective data transfer amounts requested by the separate requests sum to the data transfer amount requested by the data transfer request according to the first protocol. Disadvantageously, implementation of this proposed solution consumes an undesirably large amount of memory. Also disadvantageously, this proposed solution fails to appreciate possible data proximity in cache memory; this may result in inefficient use of cache memory.

BRIEF DESCRIPTION OF THE DRAWINGS

Features and advantages of embodiments of the claimed subject matter will become apparent as the following Detailed Description proceeds, and upon reference to the Drawings, wherein like numerals depict like parts, and in which:

Although the following Detailed Description will proceed with reference being made to illustrative embodiments of the claimed subject matter, many alternatives, modifications, and variations thereof will be apparent to those skilled in the art. Accordingly, it is intended that the claimed subject matter be viewed broadly, and be defined only as set forth in the accompanying claims.

DETAILED DESCRIPTION

Figure 1:
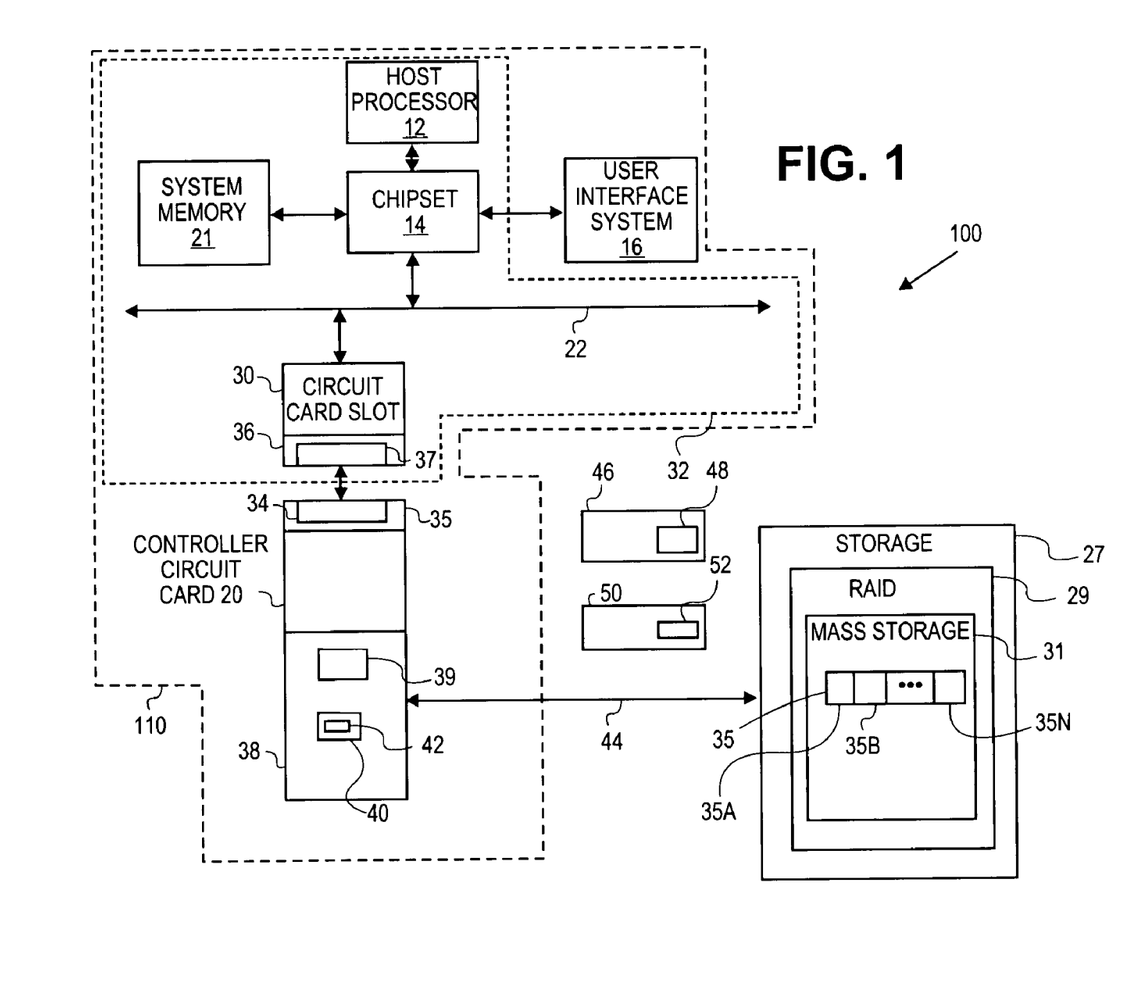
FIG. 1 is a diagram that illustrates a system embodiment.

FIG. 1 illustrates a system embodiment 100. System 100 may include a host processor 12 coupled to a chipset 14. Host processor 12 may comprise, for example, an Intel® Pentium® IV microprocessor that is commercially available from the Assignee of the subject application. Of course, alternatively, host processor 12 may comprise another type of microprocessor, such as, for example, a microprocessor that is manufactured and/or commercially available from a source other than the Assignee of the subject application, without departing from this embodiment.

Chipset 14 may comprise a host bridge/hub system that may couple host processor 12, computer-readable system memory 21, and a user interface system 16 to each other and to a bus system 22. Chipset 14 may also include an input/output (I/O) bridge/hub system (not shown) that may couple the host bridgelbus system to bus 22. Chipset 14 may comprise one or more integrated circuit chips, such as those selected from integrated circuit chipsets commercially available from the assignee of the subject application (e.g., graphics memory and I/O controller hub chipsets), although one or more other integrated circuit chips may also, or alternatively be used, without departing from this embodiment. User interface system 16 may comprise, e.g., a keyboard, pointing device, and display system that may permit a human user to input commands to, and monitor the operation of, system 100.

Bus 22 may comprise a bus that complies with the Peripheral Component Interconnect (PCI) Express™ Base Specification Revision 1.0, published Jul. 22, 2002, available from the PCI Special Interest Group, Portland, Oreg., U.S.A. (hereinafter referred to as a "PCI Express™ bus"). Alternatively, bus 22 instead may comprise a bus that complies with the PCI-X Specification Rev. 1.0a, Jul. 24, 2000, available from the aforesaid PCI Special Interest Group, Portland, Oreg., U.S.A. (hereinafter referred to as a "PCI-X bus"). Also alternatively, bus 22 may comprise other types and configurations of bus systems, without departing from this embodiment.

System embodiment 100 may comprise storage 27. Storage 27 may comprise a redundant array of independent disks (RAID) 29 including mass storage 31. Storage 27 may be communicatively coupled to an I/O controller circuit card 20 via one or more communication links 44. As used herein, "storage" means one or more apparatus and/or media into, and from which, data and/or commands may be stored and retrieved, respectively. Also as used herein, "mass storage" means storage that is capable of non-volatile storage of data and/or commands, and, for example, may include, in this embodiment, without limitation, magnetic, optical, and/or semiconductor storage devices. In this embodiment, card 20 may comprise, for example, an HBA. Of course, the number of storage devices that may be comprised in mass storage 31, RAID 29, and/or storage 27, and the number of communication links 44 may vary without departing from this embodiment.

The RAID level that may be implemented by RAID 29 may be 0, 1, or greater than 1. Depending upon, for example, the RAID level implemented in RAID 29, the number of mass storage devices that may be comprised in mass storage 31 may vary so as to permit the number of these mass storage devices to be at least sufficient to implement the RAID level implemented in RAID 29. Alternatively, without departing from this embodiment, RAID 29 and/or mass storage 31 may be eliminated from storage 27.

Processor 12, system memory 21, chipset 14, bus 22, and circuit card slot 30 may be comprised in a single circuit board, such as, for example, a system motherboard 32. Host computer system operative circuitry 110 may comprise system motherboard 32.

In this embodiment, card 20 may exchange data and/or commands with storage 27, RAID 29, and/or mass storage 31 via one or more links 44, in accordance with, e.g., a Serial Advanced Technology Attachment (SATA) protocol. Of course, alternatively, I/O controller card 20 may exchange data and/or commands with storage 27, RAID 29, and/or mass storage 31 in accordance with other and/or additional communication protocols, without departing from this embodiment.

In accordance with this embodiment, if controller card 20 exchanges data and/or commands with storage 27, RAID 29, and/or mass storage 31 in accordance with an SATA protocol, the SATA protocol may comply or be compatible with the protocol described in "Serial ATA: High Speed Serialized AT Attachment," Revision 1.0, published on Aug. 29, 2001 by the Serial ATA Working Group.

Depending upon, for example, whether bus 22 comprises a PCI Express™ bus or a PCI-X bus, circuit card slot 30 may comprise, for example, a PCI Express™ or PCI-X bus compatible or compliant expansion slot or interface 36. Interface 36 may comprise a bus connector 37 may be electrically and mechanically mated with a mating bus connector 34 that may be comprised in a bus expansion slot or interface 35 in circuit card 20.

As used herein, "circuitry" may comprise, for example, singly or in any combination, hardwired circuitry, programmable circuitry, state machine circuitry, and/or memory that may comprise program instructions that may be executed by programmable circuitry. In this embodiment, circuit card 20 may comprise operative circuitry 38 which may comprise computer-readable memory 39 and I/O processor 40. Memory 21 and/or memory 39 may comprise one or more of the following types of memories: semiconductor firmware memory, programmable memory, non-volatile memory, read only memory, electrically programmable memory, random access memory, flash memory, magnetic disk memory, and/or optical disk memory. Either additionally or alternatively, memory 21 and/or memory 39 may comprise other and/or later-developed types of computer-readable memory.

I/O processor 40 may comprise, for example, an Intel® i960® RX, IOP310, and/or IOP321 I/O processor commercially available from the Assignee of the subject application. Of course, alternatively, I/O processor 40 may comprise another type of I/O processor and/or microprocessor, such as, for example, an I/O processor and/or microprocessor that is manufactured and/or commercially available from a source other than the Assignee of the subject application, without departing from this embodiment. Processor 40 may comprise computer-readable memory 42. Memory 42 may comprise, for example, local cache memory accessible by processor 40.

Machine-readable program instructions may be stored in memory 21 and/or memory 39. These instructions may be accessed and executed by host processor 12, I/O processor 40, circuitry 110, and/or circuitry 38. When executed by host processor 12, I/O processor 40, circuitry 110, and/or circuitry 38, these instructions may result in host processor 12, I/O processor 40, circuitry 110, and/or circuitry 38 performing the operations described herein as being performed by host processor 12, I/O processor 40, circuitry 110, and/or circuitry 38.

Slot 30 and card 20 may be constructed to permit card 20 to be inserted into slot 30. When card 20 is properly inserted into slot 30, connectors 34 and 36 become electrically and mechanically coupled to each other. When connectors 34 and 36 are so coupled to each other, circuitry 38 in card 20 becomes electrically coupled to bus 22 and may exchange data and/or commands with system memory 21, host processor 12, and/or user interface system 16 via bus 22 and chipset 14.

Alternatively, without departing from this embodiment, at least a portion of operative circuitry 38 may not be comprised in card 20, but instead, may be comprised in other structures, systems, and/or devices. These other structures, systems, and/or devices may be, for example, comprised in motherboard 32, coupled to bus 22, and exchange data and/or commands with other components (such as, for example, system memory 21, host processor 12, and/or user interface system 16) in system 100. For example, without departing from this embodiment, at least a portion of circuitry 38 and/or other circuitry (not shown) may be comprised in chipset 14, chipset 14 may be coupled to storage 27 via one or more links 44, and chipset 14 may exchange data and/or commands with storage 27 in a manner that is similar to the manner in which circuitry 38 is described herein as exchanging data and/or commands with storage 27.

Figure 3:
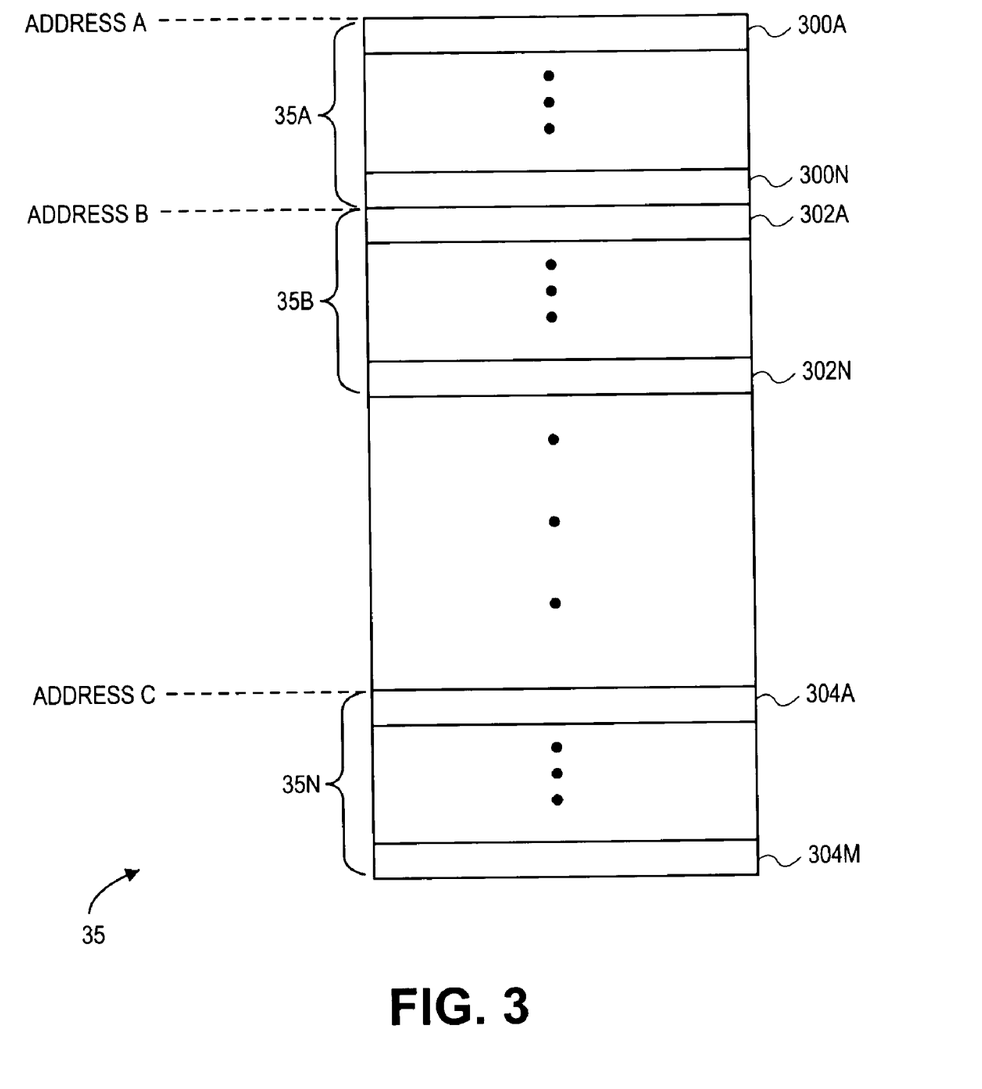
FIG. 3 illustrates data whose transfer may be requested according to an embodiment.

Mass storage 31 may be capable of storing a plurality of mutually contiguous portions 35A, 35B, . . . 35N of data 35. As shown in FIG. 3, each of these portions 35A, 35B, . . . 35N may comprise a plurality of mutually contiguous logical or physical sectors. For example, portion 35A may comprise mutually contiguous logical or physical sectors 300A . . . 300N, portion 35B may comprise mutually contiguous logical or physical sectors 302A . . . 302N, and portion 35N may comprise mutually contiguous logical or physical sectors 304A . . . 304N. Each of the sectors comprised in portions 35A, 35B . . . 35N may begin and end at respective logical and/or physical addresses in mass storage 31. Additionally, these sectors may be comprised in logical and/or physical blocks in mass storage 31. For example, the first sector 300A of portion 35A may begin at a logical or physical block address in mass storage 31 identified and/or specified by "ADDRESS A" in FIG. 3. The first sector 302A of portion 35B may begin at a logical or physical block address in mass storage 31 identified and/or specified by ADDRESS B in FIG. 3. The first sector 304A of portion 35N may begin at a logical or physical block address in mass storage 31 identified and/or specified by "ADDRESS C" in FIG. 3.

Although the respective sectors comprised in the portions 35A, 35B, . . . 35N have been previously described as being mutually contiguous, they may not be mutually contiguous, without departing from this embodiment. Likewise, without departing from this embodiment, the logical or physical blocks may not be mutually contiguous. Additionally, without departing from this embodiment, portions 35A, 35B, . . . 35N may not be mutually contiguous.

With reference now being made to FIGS. 1 to 4, operations 400 will be described that may be performed in accordance with an embodiment. After, for example, a reset of system 100, host processor 12 may generate and issue, via chipset 14, bus 22, and slot 30, a data transfer request. As used herein, a "data transfer request" means a request and/or command to transfer data. As used herein, "transferring data" means transmitting, reading, writing, storing, and/or retrieving data. In this embodiment, this data transfer request may comply, be compatible, and/or be in accordance with a first protocol. As used herein, a "protocol" means one or more rules governing exchange of data, commands, and/or requests between or among two or more entities. In this embodiment, this first protocol may comprise, for example, a Small Computer Systems Interface (SCSI) protocol described, for example, in American National Standards Institute (ANSI) Small Computer Systems Interface-2 (SCSI-2) ANSI X3.131-1994 Specification. However, without departing from this embodiment, this first protocol may comprise other and/or additional protocols.

After card 20 receives the data transfer request from host processor 12, processor 40 may examine the request to determine the amount of data requested by the request to be transferred. For example, in this embodiment, the data transfer request issued from the host processor 12 to card 20 may request that data 35 be read, retrieved, and/or transferred from mass storage 31 to host processor 12. If the data transfer request issued from host processor 12 to card 20 is in accordance with a SCSI protocol, then the request may comprise, for example, a SCSI request block that may contain one or more parameters that may indicate the amount of data comprised in data 35. Processor 40 may examine these one or more parameters to determine this amount of data 35 requested to be transferred from mass storage 31 to host processor 12.

Figure 4:
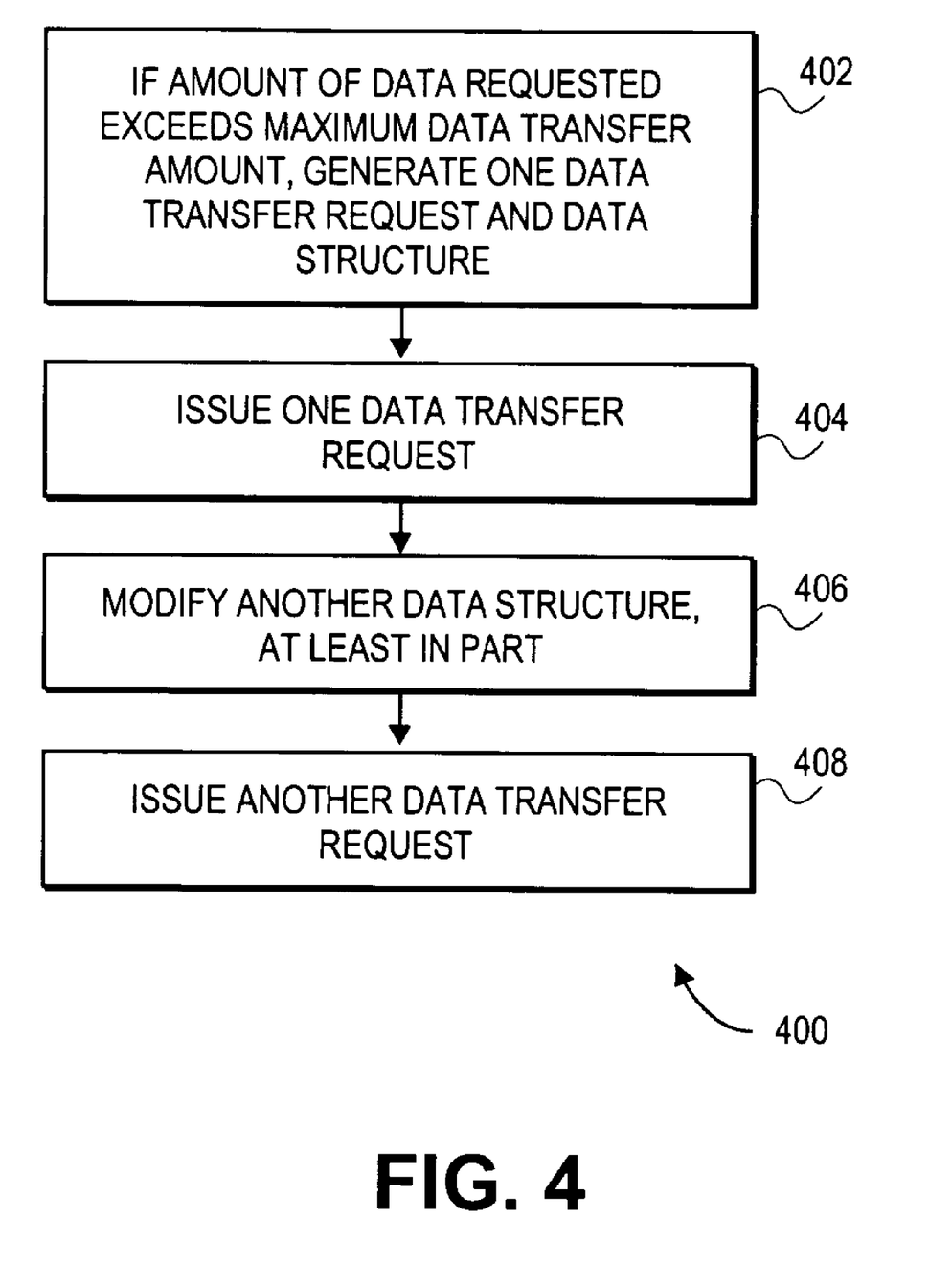
FIG. 4 is a flowchart that illustrates operations that may be performed according to an embodiment.

If processor 40 determines that the amount of data 35 requested to be transferred from mass storage 31 to host processor 12 exceeds a maximum data transfer amount permitted to be requested by a single data transfer request according to a second protocol, in response at least in part to the request from the host processor 12, processor 40 may generate a data transfer request according to the second protocol and a data structure, as illustrated by operation 402 in FIG. 4. As used herein, a "data structure" means a set, collection, and/or group of one or more values and/or variables that may be referenced and/or referred to collectively as a single unit. For example, in this embodiment, as stated previously, controller card 20 may exchange data and/or commands with storage 27, RAID 29, and/or mass storage 31 in accordance with an SATA protocol; in this embodiment, this second protocol may comprise an SATA protocol. This SATA protocol may specify a maximum amount of data that a single data transfer request in accordance with SATA protocol may request to be transferred (e.g., without violating the SATA protocol). In this embodiment, if processor 40 determines that the amount of data 35 requested to be transferred by the data transfer request issued by the host processor 12 exceeds the maximum amount of data that a single data transfer request in accordance with SATA protocol may request to be transferred, processor 40 may generate, as a result of operation 402, a data transfer request 46 in accordance with SATA protocol and a data structure 212 (See FIG. 2). Data transfer request 46 may request that a portion (e.g., portion 35A) of data 35 whose transfer was requested by host processor 12 be read, retrieved, and transferred from mass storage 31 to circuitry 38.

Figure 2:
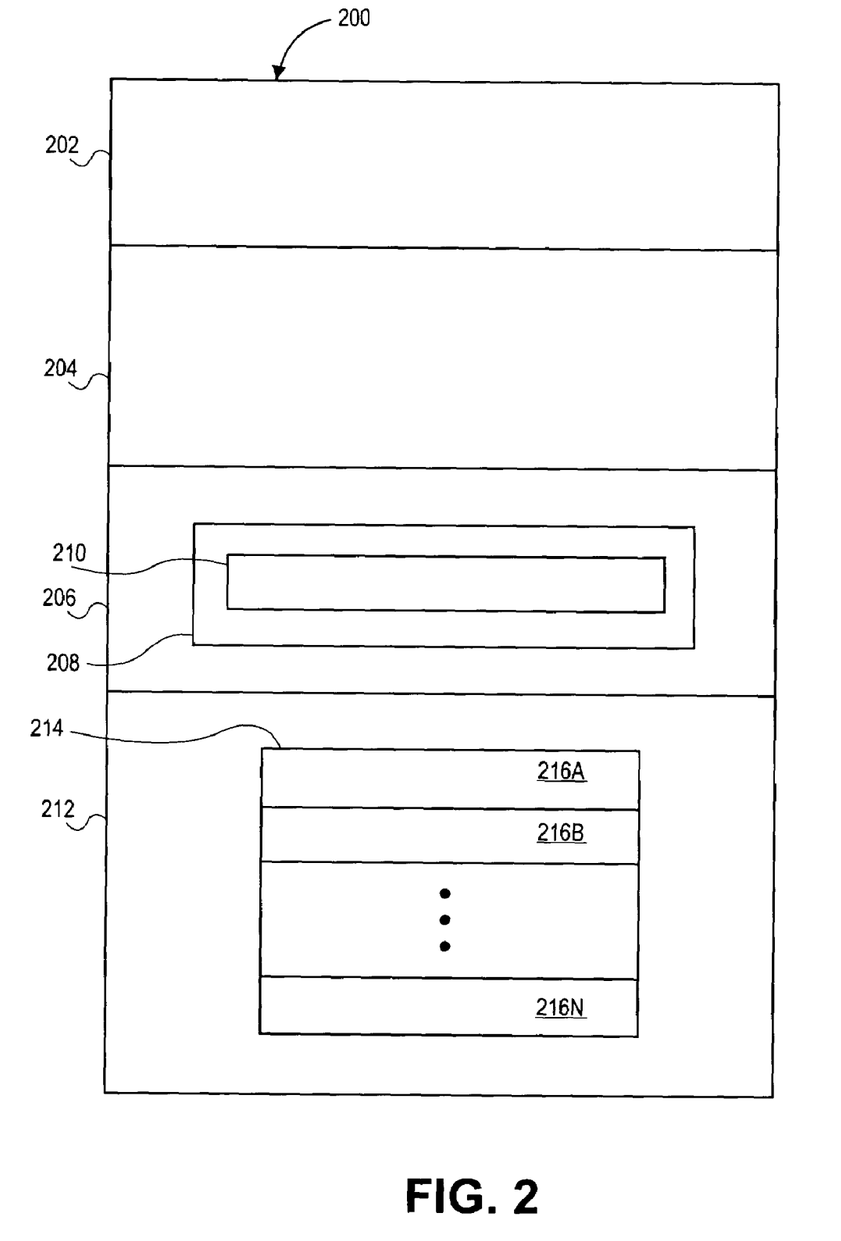
FIG. 2 illustrates data structures according to an embodiment.

For example, in this embodiment, with specific reference now being made to FIG. 2, as part of operation 402, processor 40 may store in memory 42 request block 200. Block 200 may comprise, for example, a plurality of data structures 202, 204, 206, and 212. Data structures 202 and 204 may comprise respective values that may identify and/or specify, respectively, SCSI context information and command descriptor block information obtained from the data transfer request issued by host processor 12. Data structure 206 may comprise a command task file 208 that may comprise one or more values 210 that may indicate, at least in part, one or more parameters 48 in request 46 in accordance with SATA protocol. These one or more parameters 48 may identify, at least in part, the portion 35A of data 35 requested by request 46 to be transferred from mass storage 31 to circuitry 38.

In accordance with this embodiment, data structure 212 may comprise one or more values 214 that may identify, at least in part, another portion (e.g., portion 35B) of data 35 to be transferred to circuitry 38 from mass storage 31, after storage 27 has executed request 46, and portion 35A, whose transfer to circuitry 38 is requested by request 46, has been transferred from mass storage 31 to circuitry 38.

For example, in this embodiment, one or more values 214 may comprise a plurality of values 216A, 216B, ... 216N. Value 216A may identify, at least in part, a total number of data transfer requests according to SATA protocol that, when executed by storage 27, may result in transfer of data 35 from mass storage 31 to circuitry 38. Value 216A may be calculated by processor 40 by dividing the amount of data comprised in data 35 by the maximum amount of data that a single data transfer request in accordance with SATA protocol may request to be transferred, and rounding up to the nearest whole number any fractional remainder resulting from this division. The respective values of the amount of data present in data 35, as well as, the maximum amount of data that a single data transfer request in accordance with SATA protocol may request to be transferred may be specified, for example, in terms (e.g., units) of respective numbers of sectors of mass storage 31.

Processor 40 may assign to each of the data transfer requests comprised in the total number of data transfer requests identified by value 216A a respective sequence number, for example, with the lowest assigned sequence number being assigned to data transfer request 46, and with each respective subsequently generated data transfer request being assigned a successively greater respective sequence number. In this embodiment, value 216B may be the sequence number assigned to the data transfer request most recently generated by processor 40. Thus, in this example, as initially generated by processor 40, value 216B may be the sequence number of request 46.

One or more values 214 also may include one or more values 216N that may identify, at least in part, an amount of data 35 remaining, after execution of the data transfer request most recently generated by processor 40, to be transferred from mass storage 31 to circuitry 38, and/or the location of the portion (e.g., portion 35B) of data 35 whose transfer will be requested by the next data transfer request (e.g., request 50) to be generated by processor 40. The execution by storage 27 of this next data transfer request 50 may result in transfer of another portion 35B of data 35. This remaining amount of data 35 may be identified by one or more values 216N by and/or in terms (e.g., units) of, at least in part, a number of sectors of mass storage 31. Additionally, the location of the portion 35B of data 35 whose transfer will be requested by the next data transfer request 50 to be generated by processor 40 may be identified by and/or in terms of, at least in part, a starting address (e.g., ADDRESS B) of this portion 35B of data 35.

Although data structures 202, 204, 206, and 212 have been described previously as being comprised in single contiguous block 200 in memory 42, data structures 202, 204, 206, and/or 212 may not be mutually contiguous with each other in memory 42. Other modifications are also possible without departing from this embodiment.

After or contemporaneously, at least in part, with execution of operation 402, processor 40 may signal circuitry 38. This may result in issuance of data transfer request 46 to storage 27 via one or more links 44, as illustrated by operation 404 in FIG. 4. In response, at least in part to request 46, storage 27 may execute request 46. This may result in mass storage 31 reading, retrieving, and/or transmitting portion 35A of data 35 to circuitry 38. Circuitry 38 may store portion 35A of data 35 in memory 39 and/or memory 21.

After execution of operation 404, processor 40 may modify, at least in part, data structure 206, based, at least in part, upon one or more values 214, as illustrated by operation 406 in FIG. 4. For example, in this embodiment, processor 40 may modify, at least in part, command task file 208 and/or one or more values 210 so as to comport with one or more values 216N. This may result in command task file 208 and/or one or more values 210 identifying, at least in part, portion 35B of data 35 to be requested by request 50 for transfer from mass storage 31 to circuitry 38.

After modifying, at least in part, data structure 206, processor 40 may generate request 50 and may signal circuitry 38. This may result in circuitry 38 issuing to storage 27 via one or more links 44 data transfer request 50, as illustrated by operation 408 in FIG. 4. Prior to or contemporaneously with execution of operation 408, processor 40 may modify value 216B such that value 216B may be the sequence number assigned to request 50. Request 50 may comprise one or more parameters 52 that may be indicated, at least in part, by one or more values 210, as modified, at least in part, a result of operation 406. These one or more parameters 52 may identify, at least in part, the portion 35B of data 35 requested by request 50 to be transferred from mass storage 31 to circuitry 38. In response, at least in part, to request 50, storage 27 may execute request 50. This may result in mass storage 31 reading, retrieving, and/or transmitting portion 35B of data 35 to circuitry 38. Circuitry 38 may store portion 35B of data 35 in memory 39 and/or memory 21.

In this example, prior to, contemporaneously with, or after, at least in part, execution of operation 406 and/or operation 408, processor 40 may modify, at least in part, data structure 212 such that one or more values 214 may identify, at least in part, yet another portion of data 35 whose transfer is to be requested by yet another data transfer request (not shown) to be generated by processor 40. In this embodiment, processor 40 may modify, at least in part, one or more values 216N to identify, at least in part, an amount of data 35 remaining, after execution by storage 27 of the data transfer request most recently generated by processor 40 (e.g., request 50), to be transferred from mass storage 31 to circuitry 38, and/or the location of the portion of data 35 whose transfer will be requested by this yet another data transfer request to be generated by processor 40.

For example, if portion 35N is the only remaining portion of data 35 that has yet to be transferred from mass storage 31 to circuitry 38 after execution by storage 27 of requests 46 and 50, then value 216N, as modified as a result of this most recent modification of data structure 212, may identify, at least in part, the amount of data comprised in portion 35N of data 35, by and/or in terms (e.g., units) of a number of sectors of mass storage 31. Additionally, the location of the portion 35N of data 35 whose transfer will be requested by this yet another data transfer request to be generated by processor 40 may be identified by and/or in terms of, at least in part, a starting address (e.g., ADDRESS C) of this portion 35N of data 35.

After this modification, at least in part, of data structure 212 and the execution of operation 408, processor 40 may modify, at least in part, data structure 206, based, at least in part, upon one or more values 214. For example, in this embodiment, processor 40 may modify, at least in part, command task file 208 and/or one or more values 210 so as to comport with one or more values 216N. This may result in command task file 208 and/or one or more values 210 identifying, at least in part, portion 35N of data 35 to be requested by this yet another data transfer request 50 for transfer from mass storage 31 to circuitry 38.

After this most recent modifying, at least in part, of data structure 206, processor 40 may generate this yet another data transfer request and may signal circuitry 38. This may result in circuitry 38 issuing to storage 27 via one or more links 44 this yet another data transfer request. Prior to or contemporaneously with execution of operation 408, processor 40 may modify value 216B such that value 216B may be the sequence number assigned to this yet another data transfer request. This yet another data transfer request may comprise one or more parameters that may be indicated, at least in part, by one or more values 210, as most recently modified, at least in part. These one or more parameters may identify, at least in part, the portion 35N of data 35 requested by this yet another data transfer request to be transferred from mass storage 31 to circuitry 38. In response, at least in part, to this request, storage 27 may execute this request. This may result in mass storage 31 reading, retrieving, and/or transmitting portion 35N of data 35 to circuitry 38. Circuitry 38 may store portion 35N of data 35 in memory 39 and/or memory 21.

Thereafter, circuitry 38 may transmit to host processor 12 the data 35 whose transfer was requested by host processor 12. Alternatively or additionally, circuitry 38 may transmit to and store in memory 21 data 35, and may indicate to host processor 12 that data 35 has been retrieved from storage 27, and is available to host processor 12 in memory 21.

As stated previously, the number of portions 35A, 35B, . . . 35N may vary without departing from this embodiment. Accordingly, the number of data transfer requests generated and issued to storage 27 by processor 40 may vary without departing from this embodiment.

Thus, one system embodiment may comprise a circuit board that comprises a circuit card slot, and a circuit card capable of being coupled to the slot. The card may comprise circuitry to generate, if an amount of data requested to be transferred by a data transfer request according to a first protocol exceeds a maximum data transfer amount permitted to be requested by a single data transfer request according to a second protocol, one data transfer request according to the second protocol and a data structure. The one data transfer request may request transfer of a portion of the data, and the data structure may comprise one or more values identifying, at least in part, another portion of the data. The circuitry also may be capable of modifying, at least in part, another data structure based, at least in part, upon the one or more values. The another data structure may comprise, prior to the modifying, at least in part, of the another data structure, one or more other values indicating, at least in part, one or more parameters of the one data transfer request.

These features of this system embodiment may permit fewer data transfer requests according to the first protocol to be generated and issued compared to the prior art. Advantageously, this may reduce the amount of processing resources that may be consumed to generate data transfer requests according to the first protocol. Additionally, these features of this system embodiment may obviate generating and storing in memory a linked list of separate data transfer requests according to the second protocol, may permit data comprised in the data structures of this system embodiment to be loaded into memory more efficiently compared to the prior art, and may permit these data structures to be modified, at least in part, and reused, at least in part. Advantageously, these features of this system embodiment may permit the amount of memory consumed to implement this system embodiment to be reduced, may reduce the amount of memory processing, and may permit memory resources (e.g., cache memory resources) to be used more efficiently compared to the prior art.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

What is claimed is:

1. A method comprising:
   if an amount of data requested to be transferred by a data transfer request according to a first protocol exceeds a maximum data transfer amount permitted to be requested by a single data transfer request according to a second protocol, generating one data transfer request according to the second protocol and a data structure, the one data transfer request requesting transfer of a portion of the data, the data structure comprising one or more values identifying, at least in part, another portion of the data, the one or more values in the data structure for providing one or more other values indicating parameters of any data transfer request according to the second protocol; and
   modifying in at least in part, another data structure associated with the second protocol based, at least in part, upon the one or more values, the another data structure comprising, prior to the modifying, at least in part, of the another data structure, the one or more other values indicating, at least in part, one or more parameters of the one data transfer request.

2. The method of claim 1, further comprising:
   issuing the one data transfer request to storage.

3. The method of claim 1, wherein:
   the one or more values indicate, at least in part, at least one of:
      a number of data transfer requests according to the second protocol that, when executed, result in transfer of the data; and
      an identification of the one data transfer request.

4. The method of claim 1, wherein:
   the first protocol comprises a Small Computer Systems Interface (SCSI) protocol; and
   the second protocol comprises a Serial Advanced Technology Attachment (SATA) protocol.

5. The method of claim 1, further comprising:
   issuing the one data transfer request; and
      after the modifying, at least in part, of the another data structure, issuing another data transfer request according to the second protocol, the another data structure comprising, after the modifying, at least in part, of the another data structure, one or more additional values indicating, at least in part, one or more parameters of another data transfer request.

6. The method of claim 1, wherein:
   the another portion of the data is identified, at least in part, in terms of at least one of one or more sectors of storage and an address value.

7. An apparatus comprising:
   circuitry to generate, if an amount of data requested to be transferred by a data transfer request according to a first protocol exceeds a maximum data transfer amount permitted to be requested by a single data transfer request according to a second protocol, one data transfer request according to the second protocol and a data structure, the one data transfer request requesting transfer of a portion of the data, the data structure comprising one or more values identifying, at least in part, another portion of the data, the one or more values in the data structure for providing one or more other values indicating parameters of any data transfer request according to the second protocol, the circuitry also being capable of modifying, at least in part, another data structure associated with the second protocol based, at least in part, upon the one or more values, the another data structure comprising, prior to the modifying, at least in part, of the another data structure, one or more other values indicating, at least in part, one or more parameters of the one data transfer request.

8. The apparatus of claim 7, wherein:
   the circuitry is capable of issuing the one data transfer request to storage.

9. The apparatus of claim 7, wherein:
   the one or more values indicate, at least in part, at least one of:
      a number of data transfer requests according to the second protocol that, when executed, result in transfer of the data; and
      an identification of the one data transfer request.

10. The apparatus of claim 7, wherein:
    the first protocol comprises a Small Computer Systems Interface (SCSI) protocol; and
    the second protocol comprises a Serial Advanced Technology Attachment (SATA) protocol.

11. The apparatus of claim 7, wherein:
    the circuitry is also capable of issuing the one data transfer request and, after the modifying, at least in part, of the another data structure, issuing another data transfer request according to the second protocol, the another data structure comprising, after the modifying, at least in part, of the another data structure, one or more additional values indicating, at least in part, one or more parameters of another data transfer request.

12. The apparatus of claim 7, wherein:
    the another portion of the data is identified, at least in part, in terms of at least one of one or more sectors of storage and an address value.

13. An article comprising:
    a storage medium having stored therein instructions that when executed by a machine result in the following:
       if an amount of data requested to be transferred by a data transfer request according to a first protocol exceeds a maximum data transfer amount permitted to be requested by a single data transfer request according to a second protocol, generating one data transfer request according to the second protocol and a data structure, the one data transfer request requesting transfer of a portion of the data, the data structure comprising one or more values identifying, at least in part, another portion of the data, the one or more values in the data structure for providing one or more other values indicating parameters of any data transfer request according to the second protocol; and modifying, at least in part, another data structure associated with the second protocol based, at least in part, upon the one or more values, the another data structure comprising, prior to the modifying, at least in part, of the another data structure, one or more other values indicating, at least in part, one or more parameters of the one data transfer request.

14. The article of claim 13, wherein the instructions when executed by the machine also result in:

issuing the one data transfer request to storage.

15. The article of claim 13, wherein:

the one or more values also indicate, at least in part, at least one of:

a number of data transfer requests according to the second protocol that, when executed, result in transfer of the data; and an identification of the one data transfer request.

16. The article of claim 13, wherein:

the first protocol comprises a Small Computer Systems Interface (SCSI) protocol; and the second protocol comprises a Serial Advanced Technology Attachment (SATA) protocol.

17. The article of claim 13, wherein the instructions when executed by the machine also result in:

issuing the one data transfer request; and after the modifying, at least in part, of the another data structure, issuing another data transfer request according to the second protocol, the another data structure comprising, after the modifying, at least in part, of the another data structure, one or more additional values indicating, at least in part, one or more parameters of another data transfer request.

18. The article of claim 13, wherein:

the another portion of the data is identified, at least in part, in terms of at least one of one or more sectors of storage and an address value.

19. A system comprising:

a circuit board comprising a circuit card slot; and a circuit card capable of being coupled to the slot, the card comprising circuitry to generate, if an amount of data requested to be transferred by a data transfer request according to a first protocol exceeds a maximum data transfer amount permitted to be requested by a single data transfer request according to a second protocol, one data transfer request according to the second protocol and a data structure, the one data transfer request requesting transfer of a portion of the data, the data structure comprising one or more values identifying, at least in part, another portion of the data, the one or more values in the data structure for providing one or more other values indicating parameters of any data transfer request according to the second protocol, the circuitry also being capable of modifying, at least in part, another data structure associated with the second protocol based, at least in part, upon the one or more values, the another data structure comprising, prior to the modifying, at least in part, of the another data structure, one or more other values indicating, at least in part, one or more parameters of the one data transfer request.

20. The system of claim 19, wherein:

the circuit board also comprises a processor and a bus via which the processor is coupled to the slot.

21. The system of claim 19, further comprising:

storage coupled to the card, the circuitry being capable of issuing the one data transfer request to the storage.

22. The system of claim 21, wherein:

the storage is capable of executing the one data transfer request.

* * * * *